United States Patent
Zhang et al.

(10) Patent No.: US 11,921,639 B2
(45) Date of Patent: Mar. 5, 2024

(54) METHOD FOR CACHING DATA, A HOST DEVICE FOR CACHING DATA, AND A STORAGE SYSTEM FOR CACHING DATA

(71) Applicant: SAMSUNG ELECTRONICS CO., LTD., Suwon-si (KR)

(72) Inventors: Heng Zhang, Suwon-si (KR); Yuanyuan Ye, Suwon-si (KR); Huimei Xiong, Suwon-si (KR); Yunchang Liang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/852,021

(22) Filed: Jun. 28, 2022

(65) Prior Publication Data

US 2023/0376421 A1 Nov. 23, 2023

(30) Foreign Application Priority Data

May 23, 2022 (CN) .......................... 202210566261.4

(51) Int. Cl.
*G06F 12/0871* (2016.01)
*G06F 12/02* (2006.01)
*G06F 12/0831* (2016.01)

(52) U.S. Cl.
CPC ...... *G06F 12/0871* (2013.01); *G06F 12/0238* (2013.01); *G06F 12/0833* (2013.01); *G06F 2212/7201* (2013.01)

(58) Field of Classification Search
CPC ............ G06F 12/0871; G06F 12/0238; G06F 12/0833; G06F 2212/7201
See application file for complete search history.

(56) References Cited

U.S. PATENT DOCUMENTS

| | | | |
|---|---|---|---|
| 9,158,673 B2 | 10/2015 | Benhase et al. | |
| 10,558,393 B2 | 2/2020 | Shin et al. | |
| 11,074,175 B1 | 7/2021 | Kuzmin et al. | |
| 11,138,108 B2 | 10/2021 | Parry et al. | |
| 2009/0313420 A1* | 12/2009 | Wiesz | G06F 12/0246 711/135 |
| 2010/0198889 A1* | 8/2010 | Byers | G06F 16/1827 707/827 |
| 2012/0284587 A1 | 11/2012 | Yu et al. | |
| 2019/0065052 A1* | 2/2019 | Jean | G06F 3/0655 |
| 2020/0183588 A1 | 6/2020 | Lee | |
| 2020/0334169 A1* | 10/2020 | Zhang | G06F 12/0882 |

FOREIGN PATENT DOCUMENTS

| | | |
|---|---|---|
| CN | 113227995 A | 8/2021 |
| CN | 113268201 A | 8/2021 |

OTHER PUBLICATIONS

Extended European Search Report in European Appln. No. 22193602.4, dated May 23, 2023, 7 pages.

* cited by examiner

*Primary Examiner* — Gurtej Bansal
(74) *Attorney, Agent, or Firm* — Fish & Richardson P.C.

(57) ABSTRACT

A method for caching data, and a host device and a storage system that caches data. The method includes determining a first file in a storage device as a first predetermined type of file; reallocating a logical address of a predetermined logical address region to the first file; and updating a first logical address to physical address (L2P) table, corresponding to the predetermined logical address region, in a cache of the host device. The updated first L2P table includes a mapping relationship between the logical address reallocated for the first file and a physical address of the first file.

17 Claims, 9 Drawing Sheets

METHOD FOR CACHING DATA, A HOST DEVICE FOR CACHING DATA, AND A STORAGE SYSTEM FOR CACHING DATA

CROSS-REFERENCE TO RELATED APPLICATION

A claim of priority under 35 U.S.C. § 119 is made to Chinese Patent Application No. 202210566261.4, filed on May 23, 2022, in the Chinese Intellectual Property Office, the entirety of which is hereby incorporated by reference.

BACKGROUND

The present disclosure relates to data storage, and more specifically to a method for caching data, a host device for caching data, and a storage system for caching data.

Generally, when a host device performs a data access operation to a storage device, a physical address of the data to be accessed is obtained from a logical address to physical address (L2P) table stored in the storage device based on a logical address of the data to be accessed. Host performance booster (HPB) technology optimizes such a process of obtaining physical addresses from logical addresses. Specifically, HPB technology establishes a mapping table of a part of hot data in a memory of the host device, and a physical address of the data may be directly obtained from the memory of the host device through read operations of the part of hot data. As a result, a process of obtaining the physical address from the L2P table in the storage device may be omitted, improving performance of reading the data.

However, memory resources of a host device using HPB technology may be wasted due to mixed storage of cold files and hot files. Also, reduction of performance of the host device may occur due to frequent updating of the mapping table in the memory of the host device. There has thus been interest in techniques for improving performance of host devices supporting HPB technology.

SUMMARY

Embodiments of the inventive concepts provide a method of caching data including reallocating a logical address of a predetermined logical address region of a first logical to physical address (L2P) table in a cache to a first file in a storage device, when the first file changes to a first predetermined type of file; updating the first L2P table, corresponding to the predetermined logical address region in the cache. The updated first L2P table includes a mapping relationship between the logical address reallocated for the first file and a physical address of the first file.

Embodiments of the inventive concepts further provide a host device including an allocation unit that reallocates a logical address of a predetermined logical address region of a first logical address to physical address (L2P) table in a cache of the host device to a first file in a storage device, when the first file changes to a first predetermined type of file; and an updating unit that updates the first L2P table corresponding to the predetermined logical address region in the cache. The updated first L2P table includes a mapping relationship between the logical address reallocated for the first file and a physical address of the first file.

Embodiments of the inventive concepts still further provide a storage system including a storage device that stores files; and a host device that reallocates a logical address of a predetermined logical address region of a first logical address to physical address (L2P) table in the cache to a first file in the storage device, when the first file changes to a first predetermined type of file, and updates the first L2P table corresponding to the predetermined logical address region in the cache. The updated first L2P table includes a mapping relationship between the logical address reallocated for the first file and a physical address of the first file.

Embodiments of the inventive concepts also provide a non-transitory computer-readable storage medium for storing software code, when executed by a processor, for controlling a storage system comprising a storage device configured to store files, and a host device including a cache. The non-transitory computer-readable storage medium includes a first reallocation code segment for reallocating a logical address of a predetermined logical address region of a first logical address to physical address (L2P) table in the cache to a first file in the storage device, when the first file changes to a first predetermined type of file; and a first update code segment for updating the first L2P table corresponding to the predetermined logical address region in the cache. The updated first L2P table includes a mapping relationship between the logical address reallocated for the first file and a physical address of the first file.

Embodiments of the inventive concepts further provide a method of caching data including reallocating a logical address of a first predetermined logical address region to a first file in a storage device when the first file changes to a first predetermined type of file; reallocating a logical address region of a second predetermined logical address region to the file when the file changes to a second predetermined type of file; reallocating a logical address of a logical address region other than the first and second predetermined logical address regions when the first file changes to a third predetermined type of file; updating a first logical to physical address (L2P) table corresponding to the first predetermined logical address region in a cache of the host device when the file is changed to the first predetermined type of file; updating a second L2P table corresponding to the second predetermined logical address region in the cache of the host device when the file is changed to the second predetermined type of file; updating one of the first L2P table and the second L2P table to delete a mapping relationship between a logical address and a physical address of the first file when the first file is changed to the third predetermined type of file; and setting a state bitmap of an original logical address of the first file to a dirty state after deleting the mapping relationship.

BRIEF DESCRIPTION OF THE DRAWINGS

Embodiments of the inventive concepts will become clearly understood from the following detailed description taken together with the accompanying drawings in which.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
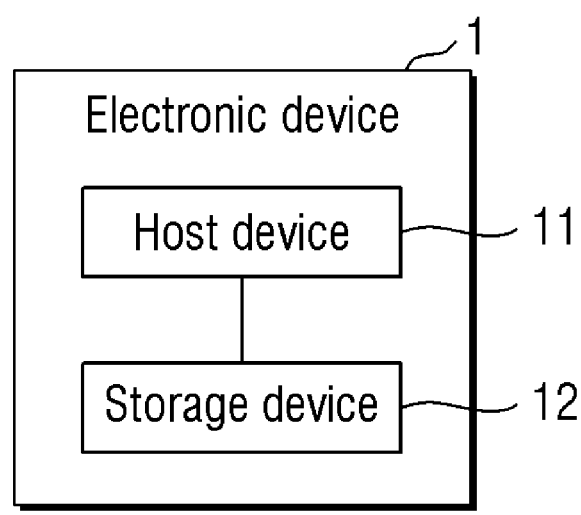
FIG. 1 illustrates a block diagram of an electronic device according to embodiments of the inventive concepts.

FIG. 1 illustrates a block diagram of an electronic device according to some embodiments of the inventive concepts.

The electronic device 1 according to various example embodiments of the inventive concepts may be, for example, a desktop computer, a laptop computer, a tablet computer, a smart phone, a wearable device, an electric vehicle, a server system, or any kind of electronic device or system using a storage device 12.

As shown in FIG. 1, the electronic device 1 according to some example embodiments may include a host device 11 and the storage device 12.

The host device 11 may allow the storage device 12 to store data generated within the host device 11 or received from a device outside of the host device 11. The host device 11 may store data generated as an execution result of an application stored in the storage device 12.

Under control of the host device 11, the storage device 12 may store data provided from the host device 11 or may output data stored therein to the host device 11 for example. For example, the storage device 12 may communicate with the host device 11 in compliance with a non-volatile memory express (NVMe) communication protocol. In other embodiments, the storage device 12 may communicate with the host device 11 in compliance with different communication protocols.

The storage device 12 may be a storage device capable of supporting Host Performance Booster (HPB) capabilities. The storage device 12 may store data or information for processing operations of the electronic device 1. The storage device 12 may include volatile memory devices, and nonvolatile memory devices. Examples of volatile memory devices may include random access memory (RAM) such as static RAM (SRAM), dynamic RAM (DRAM), and synchronous DRAM (SDRAM). Examples of nonvolatile memory devices may include flash memory, read only memory (ROM), programmable ROM (PROM), electrically programmable ROM (EPROM), electrically erasable and programmable ROM (EEPROM), phase-change RAM (PRAM), magnetic RAM (MRAM), resistive RAM (RRAM), and ferroelectric RAM (FRAM).

According to some example embodiments, the storage device 12 may store and manage mapping information of logical addresses and physical addresses in a logical address to physical address (L2P) table. For example, the storage device 12 may allocate a physical storage space to stored data, and a physical address of the physical storage space forms a mapping relationship with a logical address. The storage device 12 may store mapping information of the logical address and the allocated physical address in the L2P table.

According to some example embodiments, a part of the mapping table in the L2P table of the storage device 12 (e.g., a mapping table corresponding to hot files of storage device 12 or a mapping table corresponding to hot and warm files) may be stored in the host device 11, so that when a logical address of data that the host device 11 requests to access is within a logical address range of the part of mapping table, the host device 11 may directly obtain a physical address of the data to be accessed from the part of mapping table stored in the host device 11 based on the logical address of the data to be accessed, and then directly read the data requested for accessing from the storage device. A method for the host device caching data (e.g., the part of mapping table) according to some example embodiments is described below with reference to FIGS. 2 to 4.

Figure 2:
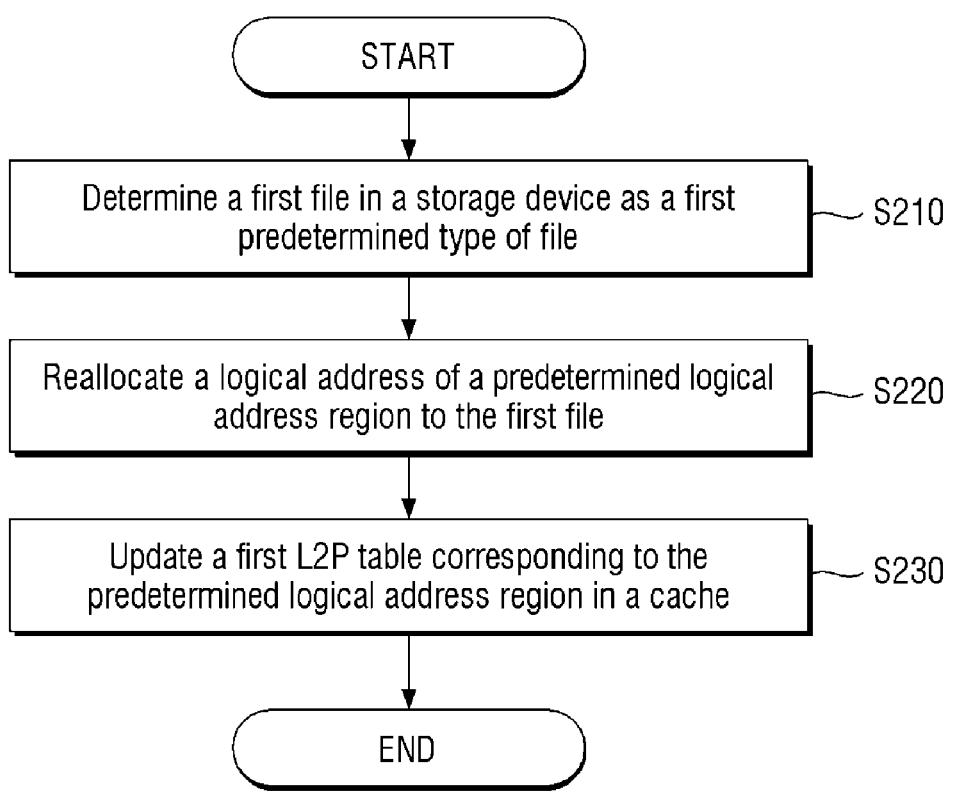
FIG. 2 illustrates a flowchart of a method for caching data according to embodiments of the inventive concepts.

FIG. 2 illustrates a flowchart of a method for caching data according to embodiments of the inventive concepts.

As shown in FIG. 2, in operation S210, a host device 11 may determine a first file in the storage device 12 as a first predetermined type of file. In this case, the first predetermined type of file may be a hot file. For example, the files in the storage device 12 may be characterized as hot files, warm files or cold files. For example, the files may be characterized as hot, warm or cold.

According to some example embodiments, the host device 11 may obtain or determine a change in a heat of the first file in the storage device 12, and when the first file is a file whose heat is changed from outside a first predetermined heat range to within the first predetermined heat range, the host device 11 may determine the first file as a hot file. For example, the first predetermined heat range may be a range corresponding to hot files.

For example, in embodiments of the inventive concepts, the heat of the first file may be determined based on an access frequency of the first file in the storage device 12. However, examples are not limited thereto, and in other embodiments other criteria (e.g., creation time of the file, etc.) may be used to determine the heat of the first file.

For example, the first predetermined heat range may be a range higher than (e.g., greater than or equal to) a first threshold, and the first threshold may be predetermined.

According to some example embodiments, the host device 11 may periodically obtain the change in the heat of the first file in the storage device 12, or the host device 11 may update the heat of the first file to be read and obtain the change in the heat of the first file to be read, in response to a request for reading the first file. It should however be understood to those skilled in the art that the inventive concepts are not limited to determining the change in the heat of a file as described above, and that in other embodiments various known methods may be used to obtain the change of the heat of the first file and determine whether the first file is a hot file.

According to some example embodiments, the host device 11 may store information about the heat of the files stored in the storage device 12 in a file heat manager (not shown) of the host device 11.

In operation S220, the host device 11 may reallocate a logical address of a predetermined logical address region to the first file.

According to some example embodiments, the host device 11 may read the first file from the storage device 12, and reallocate a new logical address of the predetermined logical address region to the first file. In other words, the first file may be allocated a new logical address within the predetermined logical address region. According to some example embodiments, in order to prevent the predetermined logical address region from being used, the host device 11 may allocate a logical address other than the predetermined logical address region to a new file after receiving a command for writing the new file.

In operation S230, the host device 11 may update a first L2P table, corresponding to the predetermined logical address region, in a cache (e.g., a cache of the host device 11).

According to some example embodiments, the host device 11 may write the first file to the storage device 12, so that the storage device 12 writes the first file to a new physical address and establishes a mapping relationship between the reallocated logical address and the new physical address in an L2P table of the storage device 12. Then, the host device 11 may acquire the mapping relationship between the reallocated logical address and the new physical address of the first file from the storage device 12, and update the first L2P table in the cache of the host device 11 based on the mapping relationship.

According to some example embodiments, the host device 11 may establish a mapping relationship between the reallocated logical address of the first file and an original physical address of the first file, in the first L2P table. In addition, the host device 11 may transmit a logical address update message including an original logical address and the reallocated logical address of the first file to the storage device 12 through a reserved interface, so that the storage device 12 establishes the mapping relationship between the reallocated logical address and the original physical address of the first file in the L2P table.

Alternatively, the host device 11 may firstly transmit the logical address update message including the original logical address and the reallocated logical address of the first file to the storage device 12 through the reserved interface, so that the storage device 12 establishes the mapping relationship between the reallocated logical address and the original physical address of the first file. Then, the host device 11 may acquire the mapping relationship between the reallocated logical address and the original physical address of the first file from the storage device 12, and update the first L2P table in the cache based on the mapping relationship.

For example, the cache of the host device 11 may be a non-volatile memory or a volatile memory. When the cache is volatile memory, and after the host device 11 is powered on, heat information of files in the storage device 12 and the first L2P table may be loaded from the storage device 12 to the cache of the host device 11. Before the host device 11 is powered off, the heat information of the files in the storage device 12 and the first L2P table are written into the storage device 12, so as to avoid loss of the information due to the powering off of the host device.

In embodiments of the inventive concepts, since logical addresses of the hot files are migrated to the predetermined logical address region, and mapping relationships between the logical addresses and physical addresses of the hot files are updated to the L2P table of the cache in the host device 11, when the host device 11 accesses the hot files, the physical addresses of the hot files may be acquired from the L2P table of the cache based on the logical addresses of the hot files, and the hot files may be accessed from the storage device 12 based on the physical addresses of the hot files. As such, wasting of memory resources of the host device 11 may be avoided, the frequency of updating the L2P table of the host device 11 and the frequency of reading the L2P table from the storage device 12 may be reduced, and the performance of the host device 11 supporting HPB technology may be improved.

Figure 3:
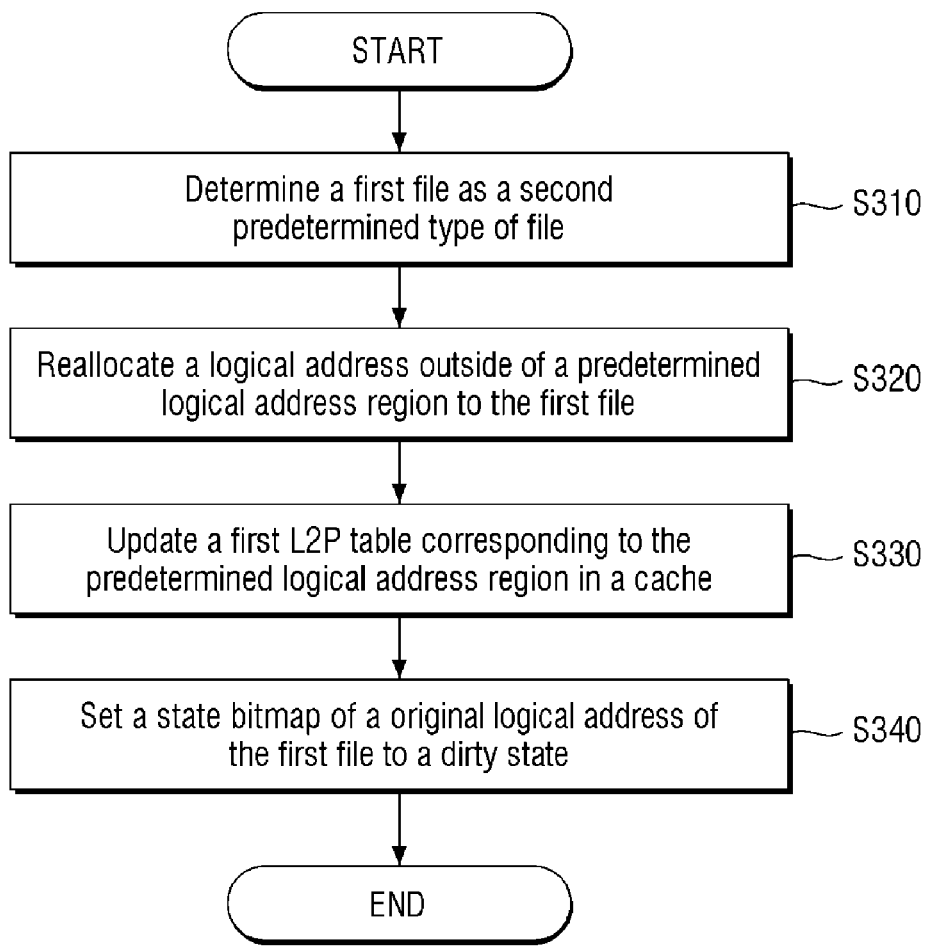
FIG. 3 illustrates a flowchart of a method for caching data according to embodiments of the inventive concepts.

FIG. 3 illustrates a flowchart of a method for caching data according to embodiments of the inventive concepts.

In order to improve a hit rate of the cache and save memory resources of the host device 11, the host device 11 according to some example embodiments also detects cold files, and classifies and centrally manages the cold files.

Particularly, as shown in FIG. 3, in operation S310, the host device 11 may determine a first file as a second predetermined type of file. In this case, the second predetermined type of file may be a cold file.

According to some example embodiments, the host device 11 may obtain or determine a change in a heat of the first file in the storage device 12, and when the first file is a file whose heat is changed from outside a second predetermined heat range to within the second predetermined heat range, the host device 11 may determine the first file as a cold file.

For example, the second predetermined heat range may be a range lower than (e.g., smaller than) the first threshold.

In operation S320, the host device 11 may reallocate a logical address outside of a predetermined logical address region to the first file.

According to some example embodiments, the host device 11 may read the first file from the storage device 12, and reallocate the logical address outside the predetermined logical address region to the first file.

In operation S330, the host device 11 may update the first L2P table, corresponding to the predetermined logical address region, in a cache of the host device 11.

According to some example embodiments, the host device 11 may write the first file to the storage device 12, so that the storage device 12 writes the first file to a new physical address and establishes a mapping relationship between the reallocated logical address and the new physical address in an L2P table of the storage device 12. Then, the host device 11 may delete a mapping relationship between an original logical address and an original physical address of the first file from the first L2P table to update the first L2P table in the cache of the host device 11.

According to some example embodiments, the host device 11 may transmit a logical address update message including the original logical address and the reallocated logical address of the first file to the storage device 12 through a reserved interface, so that the storage device 12 establishes a mapping relationship between the reallocated logical address and an original physical address of the first file. Then, the host device 11 may delete a mapping relationship between the original logical address and the original physical address of the first file from the first L2P table to update the first L2P table in the cache of the host device 11.

In operation S340, the host device 11 may set a state bitmap of the original logical address of the first file to a dirty state. The state bitmap may be stored in the host device 11.

According to some example embodiments, the host device 11 may set the state bitmap of the original logical address (e.g., the original logical address is an address within the predetermined logical address region) of the first file to the dirty state.

According to embodiments of the inventive concepts, since logical addresses of the cold files are migrated to outside of the predetermined logical address region, and mapping relationships between the logical addresses and physical addresses of the cold files are deleted from the L2P table of the cache in the host device 11, the logical addresses of the cold files may be transmitted to the storage device 12 when the host device 11 accesses the cold files, so that the storage device 12 acquires the physical addresses of the cold files from the L2P table in the storage device 12 based on the logical addresses of the cold files and transmits the cold files to the host device 11 based on the physical addresses of the cold files. As such, wasting of memory resources of the host device 11 may be avoided, the frequency of updating the L2P table of the host device 11 and the frequency of reading the L2P table from the storage device 12 may be reduced, and the performance of the host device 11 supporting the HPB technology may be improved.

In addition, since a unit by which the host device 11 performs a garbage collection operation is larger than a unit by which the host device 11 manages the logical addresses, the hot and cold files may be mixed together again and may not be distinguishable from each other due to the garbage collection operation. Therefore, in order to avoid this problem, garbage collection operations may be performed for the predetermined logical address region and a logical address region other than the predetermined logical address respectively, when the host device 11 enters an idle state.

Figure 4:
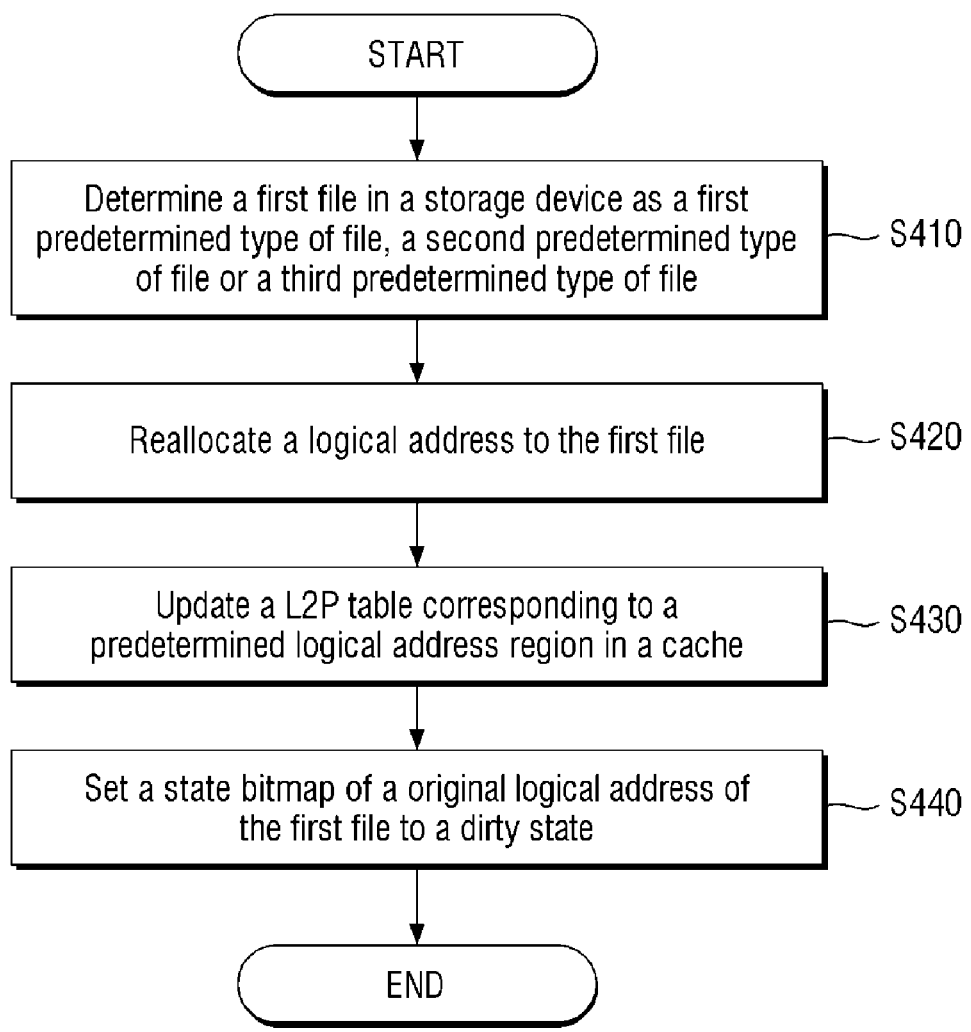
FIG. 4 illustrates a flowchart of a method for caching data according to embodiments of the inventive concepts.

FIG. 4 illustrates a flowchart of a method for caching data according to embodiments of the inventive concepts.

In order to further reduce the frequency of updating the L2P table of the host device 11 and make the heat of files within a predetermined logical address region more balanced, in addition to the hot files and the cold files, the host device 11 may also determine warm files in the storage device 12, and migrate the logical addresses of the warm files to the predetermined logical address region.

As shown in FIG. 4, in operation S410, the host device 11 may determine a first file in a storage device 12 as a first predetermined type of file, a second predetermined type of file or a third predetermined type of file. In this case, the first predetermined type of file may be a hot file, the second predetermined type of file may be a warm file, and the third predetermined type of file may be a cold file.

According to some example embodiments, the host device 11 may obtain or determine a change in a heat of the first file, and when the first file is a file whose heat is changed from outside a first predetermined heat range to within the first predetermined heat range, the host device 11 may determine the first file as the hot file. When the first file is a file whose heat is changed from outside a second predetermined heat range to within the second predetermined heat range, the host device 11 may determine the first file as the warm file. When the first file is a file whose heat is changed from outside a third predetermined heat range to within the third predetermined heat range, the host device 11 may determine the first file as the cold file.

For example, the first predetermined heat range may be a range higher than a first threshold, the second predetermined heat range may be a range lower than the first threshold and higher than a second threshold, and the third predetermined heat range may be a range lower than the second threshold, wherein the first threshold is greater than the second threshold.

In operation S420, the host device 11 may reallocate a logical address to the first file.

According to some example embodiments, when the first file is determined as a hot file, the host device 11 may reallocate a logical address of a predetermined logical address region (e.g., a predetermined first logical address region) to the first file. When the first file is determined as a warm file, the host device 11 may reallocate a logical address of another predetermined logical address region (e.g., a predetermined second logical address region) to the first file. When the first file is determined as a cold file, the host device 11 may reallocate, to the first file, a logical address of a logical address region other than the above-mentioned predetermined logical address region (for example, a logical address region other than the predetermined first logical address region and the predetermined second logical address region).

In operation S430, the host device 11 may update an L2P table corresponding to the predetermined logical address region in a cache of the host device 11.

When the first file is determined as the hot file, the host device 11 may update a first L2P table corresponding to the predetermined first logical address region in the cache of the host device 11. When the first file is determined as the warm file, the host device 11 may update a second L2P table corresponding to the predetermined second logical address region in the cache of the host device 11. When the first file is determined as the cold file, the host device 11 may update the first L2P table or the second L2P table, so that a mapping relationship between a logical address and a physical address of the first file is deleted from the corresponding first L2P table or the second L2P table in the cache of the host device 11.

When the first file is determined as the hot file or the warm file, a method of updating the L2P table in the cache may be similar to the method of updating the first L2P table in the cache in operation S230. When the first file is determined as the cold file, the method of updating the L2P table in the cache may be similar to the method of updating the first L2P table in the cache in operation S330, and thus repeated description will be omitted to avoid redundancy.

In operation S440, the host device 11 may set a state bitmap of an original logical address of the first file to a dirty state.

In embodiments of the inventive concepts, when the host device 11 accesses the hot files or the warm files, the host device 11 may acquire the physical addresses of the hot files from the first L2P table based on the logical addresses of the hot files, or acquire the physical addresses of the warm files from the second L2P table based on the logical addresses of the warm files, and may access the hot files from the storage device 12 based on the physical addresses of the hot files, or access the warm files from the storage device 12 based on the physical addresses of the warm files.

In addition, when the host device 11 accesses the cold files, the host device 11 may transmit the logical addresses of the cold files to the storage device 12, so that the storage device 12 acquires the physical addresses of the cold files from the L2P table in the storage device 12 based on the logical addresses of the cold files and transmits the cold files to the host device 11 based on the physical addresses of the cold files.

In embodiments of the inventive concepts, since logical addresses of the hot files and the warm files are migrated to the predetermined logical address region, and mapping relationships between the logical addresses and physical addresses of the hot files and the warm files are updated to the L2P table of the cache in the host device 11, classification gradients of the files in the storage device 12 may be increased, the frequency of updating the L2P table of the host device 11 may be further reduced and the heat of files within the predetermined logical address region may be more balanced.

When the host device 11 is performing a garbage collection operation on logical addresses of a file system, the hot, warm and cold files may be mixed together and may not be distinguishable from each other. Therefore, in order to avoid this problem, garbage collection operations may be performed for the predetermined logical address region, the other predetermined logical address region and the logical address region other than the predetermined logical address regions respectively, when the host device 11 enters an idle state.

Figure 5:
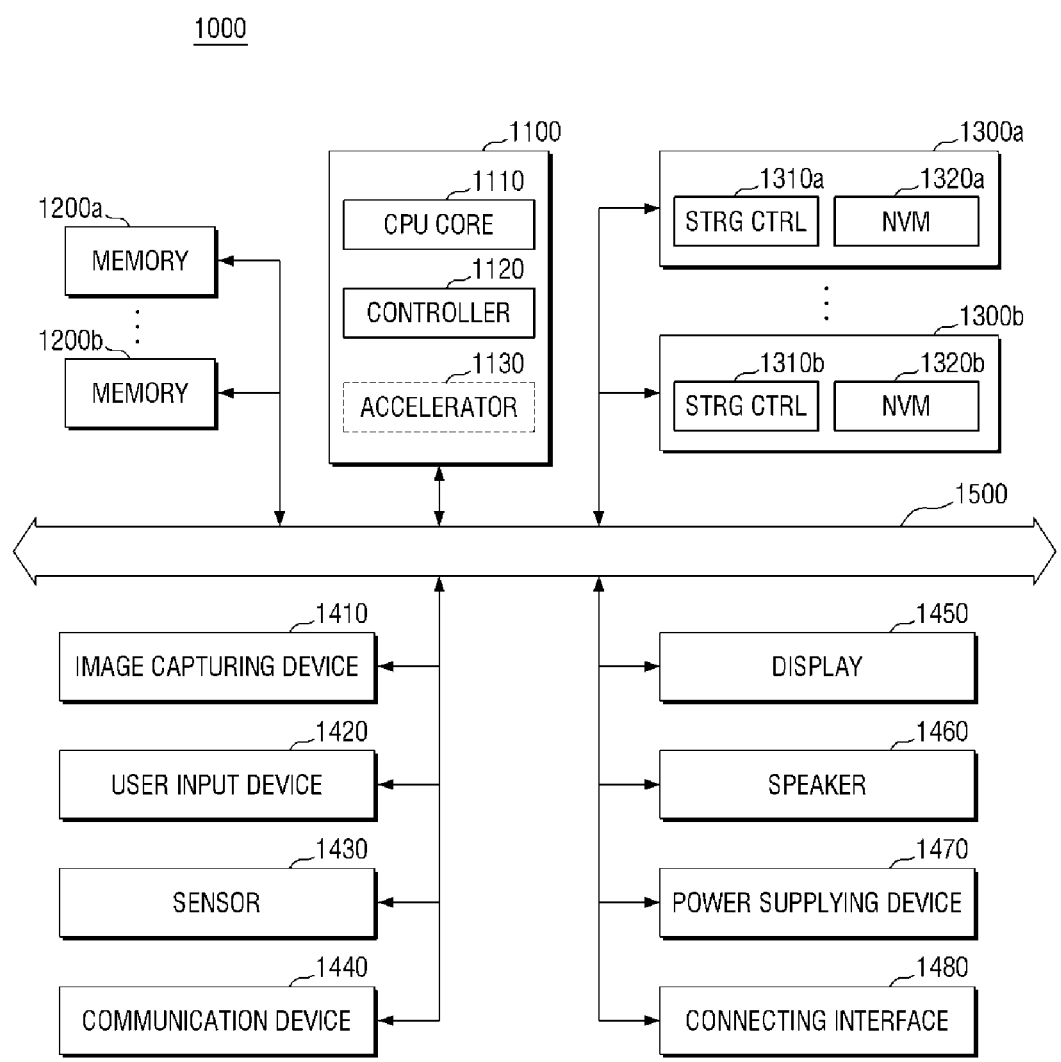
FIG. 5 illustrates a diagram of a system to which a storage device is applied, according to embodiments of the inventive concepts.

FIG. 5 illustrates a diagram of a system 1000 to which a storage device such as described with reference to FIGS. 1-4 may be applied, according to embodiments of the inventive concepts. The system 1000 of FIG. 5 may be for example a mobile system such as a portable communication terminal (e.g., a mobile phone), a smartphone, a tablet personal computer (PC), a wearable device, a healthcare device, or an Internet of things (IOT) device, or the like. However, the system 1000 of FIG. 5 is not necessarily limited to a mobile system and in other embodiments the system 1000 may be for example a PC, a laptop computer, a server, a media player, or an automotive device (e.g., a navigation device), or the like.

Referring to FIG. 5, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480. The devices and/or components of the system 1000 may be connected to each other by a bus 1500.

The main processor 1100 may control all operations of the system 1000, more specifically operations of other components included in the system 1000. The main processor 1100 may be implemented for example as a general-purpose processor, a dedicated processor, or an application processor.

The main processor 1100 may include at least one CPU core 1110, and further include a controller 1120 configured to control the memories 1200a and 1200b and/or the storage devices 1300a and 1300b. In some embodiments, the main processor 1100 may further include an accelerator 1130, which is a dedicated circuit for high-speed data operation, such as an artificial intelligence (AI) data operation. The accelerator 1130 may include for example a graphics processing unit (GPU), a neural processing unit (NPU) and/or a data processing unit (DPU) and may be implemented as a chip that is physically separate from the other components of the main processor 1100.

The memories 1200a and 1200b may be used as main memory devices of the system 1000. Although each of the memories 1200a and 1200b may include a volatile memory such as for example static random access memory (SRAM) and/or dynamic RAM (DRAM), each of the memories 1200a and 1200b may include non-volatile memory such as for example flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVMs (Non-Volatile Memories) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs such as for example PRAM and/or RRAM.

The storage devices 1300a and 1300b may be physically separated from the main processor 1100 and included in the system 1000, or implemented in the same package as the main processor 1100. In addition, the storage devices 1300a and 1300b may have types of solid-state devices (SSDs) or memory cards, and may be removably combined with other components of the system 100 through an interface such as the connecting interface 1480 described hereinafter. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and may include a touch pad, a keypad, a keyboard, a mouse, and/or a microphone.

The sensor 1430 may detect various types of physical quantities, which may be obtained from outside of the system 1000, and convert the detected physical quantities into electric signals. The sensor 1430 may include for example a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem among other components.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

It should be understood to those skilled in the art that the storage devices (e.g., 1300a and 1300b) may support HPB.

As an example, there is provided a system (e.g., 1000) to which a storage device is applied, including: a main processor (e.g., 1100); memories (e.g., 1200a and 1200b) storing one or more instructions; and storage devices (e.g., 1300a and 1300b) supporting the HPB. At least the main processor 1100 and the memories 1200a and 1200b may correspond to and function together as a host device such as host device 11 in FIG. 1 where the memories 1200a and/or 1200b are used as caches of the host device, and the main processor 1100 executes the one or more instructions to perform the above method for caching data. The storage devices 1300a and 1300b may correspond to and function as a storage device such as the storage device 12 shown in FIG. 1.

Figure 6:
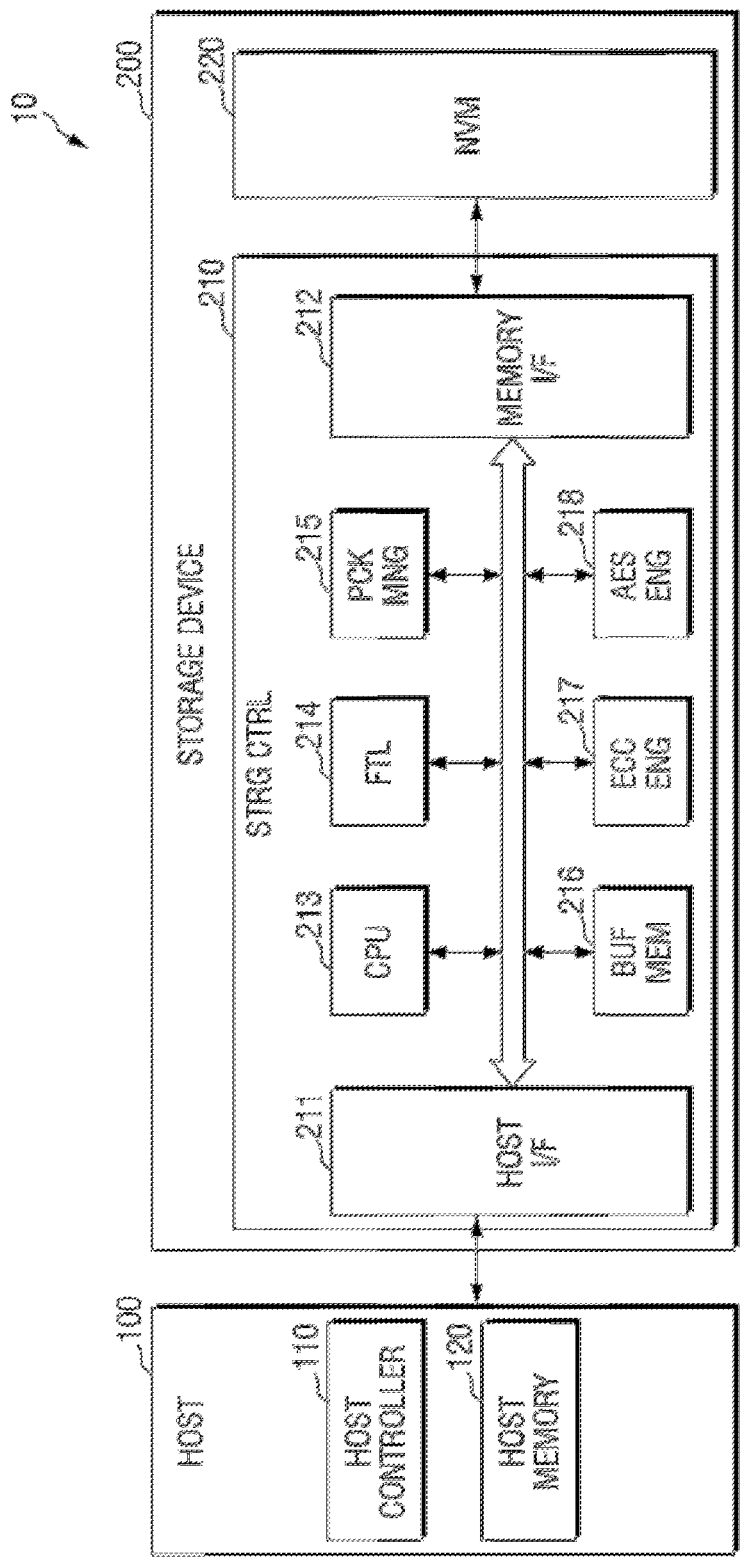
FIG. 6 illustrates a block diagram of a host storage system according to embodiments of the inventive concepts.

FIG. 6 illustrates a block diagram of a host storage system 10 according to some example embodiments of the inventive concepts.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200. For example, the host 100 may correspond to the above-described host device 11, and the storage device 200 may correspond to the above-described storage device 12.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of modules included in an application processor (AP). The AP may be implemented as a System on Chip (SoC). Further, the host memory 120 may be an embedded memory included in the AP or an NVM or memory module located outside the AP. The host memory 120 may correspond to the above-mentioned cache described with respect to FIGS. 1-4 for example.

The host controller 110 may manage an operation of storing data (e.g., write data) of a buffer region of the host memory 120 in the NVM 220 or an operation of storing data (e.g., read data) of the NVM 220 in the buffer region of the host memory 120.

The host controller 110 executes a computer program for the method for caching data as described above with respect to FIGS. 1-4.

As shown in FIG. 6, the storage controller 210 may include a host interface (IF) 211, a memory interface 212, and a CPU 213. Further, the storage controllers 210 may further include a flash translation layer (FTL) 214, a packet manager (PCK MNG) 215, a buffer memory (BUF MEM) 216, an error correction code (ECC ENG) engine 217, and an advanced encryption standard engine (AES ENG) 218.

Figure 7:
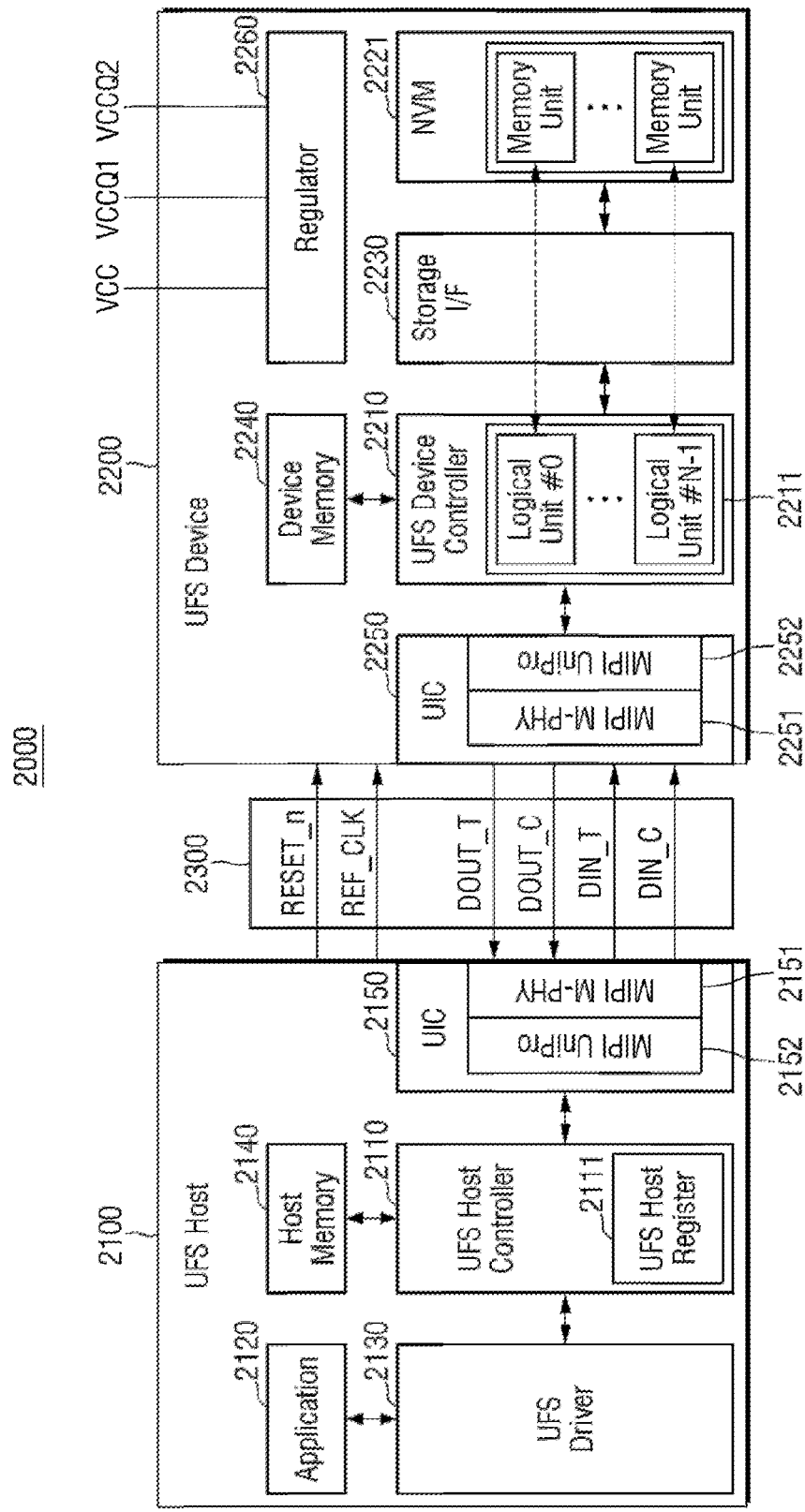
FIG. 7 illustrates a diagram of a UFS system according to embodiments of the inventive concepts.

FIG. 7 illustrates a diagram of a UFS system 2000 according to embodiments of the inventive concepts.

The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 5 may also be applied to the UFS system 2000 of FIG. 7 within a range that does not conflict with the following description of FIG. 7.

Referring to FIG. 7, the UFS host 2100 may be connected to the UFS device 2200 through the UFS interface 2300. When the main processor 1100 of FIG. 5 is an AP, the UFS host 2100 may be implemented as a portion of the AP. The UFS host controller 2110 and the host memory 2140 may respectively correspond to the controller 1120 of the main processor 1100 and the memories 1200a and 1200b of FIG. 5. The UFS device 2200 may correspond to the storage device 1300a and 1300b of FIG. 5, and a UFS device controller 2210 and an NVM 2220 may respectively correspond to the storage controllers 1310a and 1310b and the NVMs 1320a and 1320b of FIG. 5. For example, the UFS host 2100 may correspond to the host device 11 of FIG. 1 where the host memory 2140 may correspond to the above mentioned cache, and the UFS device 2200 may correspond to the storage device of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include other kinds of NVM such as for example PRAM and/or RRAM. The UFS device controller 2210 may be connected to the NVM 2220 through the storage interface 2230. The storage interface 2230 may be configured to comply with a standard protocol, such as for example Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI®) M-PHY 2151 and an MIPI® UniPro 2152, and the UIC layer 2250 on the side of the UFS device 2200 may also include an MIPI® M-PHY 2251 and an MIPI® UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

The UFS device controller 2210 may manage the NVM 2220 by using a logical unit (LU) 2211, which is a logical data storage unit. The number of LUs 2211 may be 8, without being limited thereto.

Voltages VCC, VCCQ1, and VCCQ2 may be applied as power supply voltages to the UFS device 2200 by the regulator 2260.

According to embodiments of the inventive concepts, there is provided a UFS system (e.g., 2000) including: a UFS host (e.g., 2100); a UFS device (e.g., 2200); and a UFS interface (2300) for a communication between the UFS host and the UFS device, wherein the UFS host is configured to perform the method for caching data as described above with respect to FIGS. 1-4.

Figure 8:
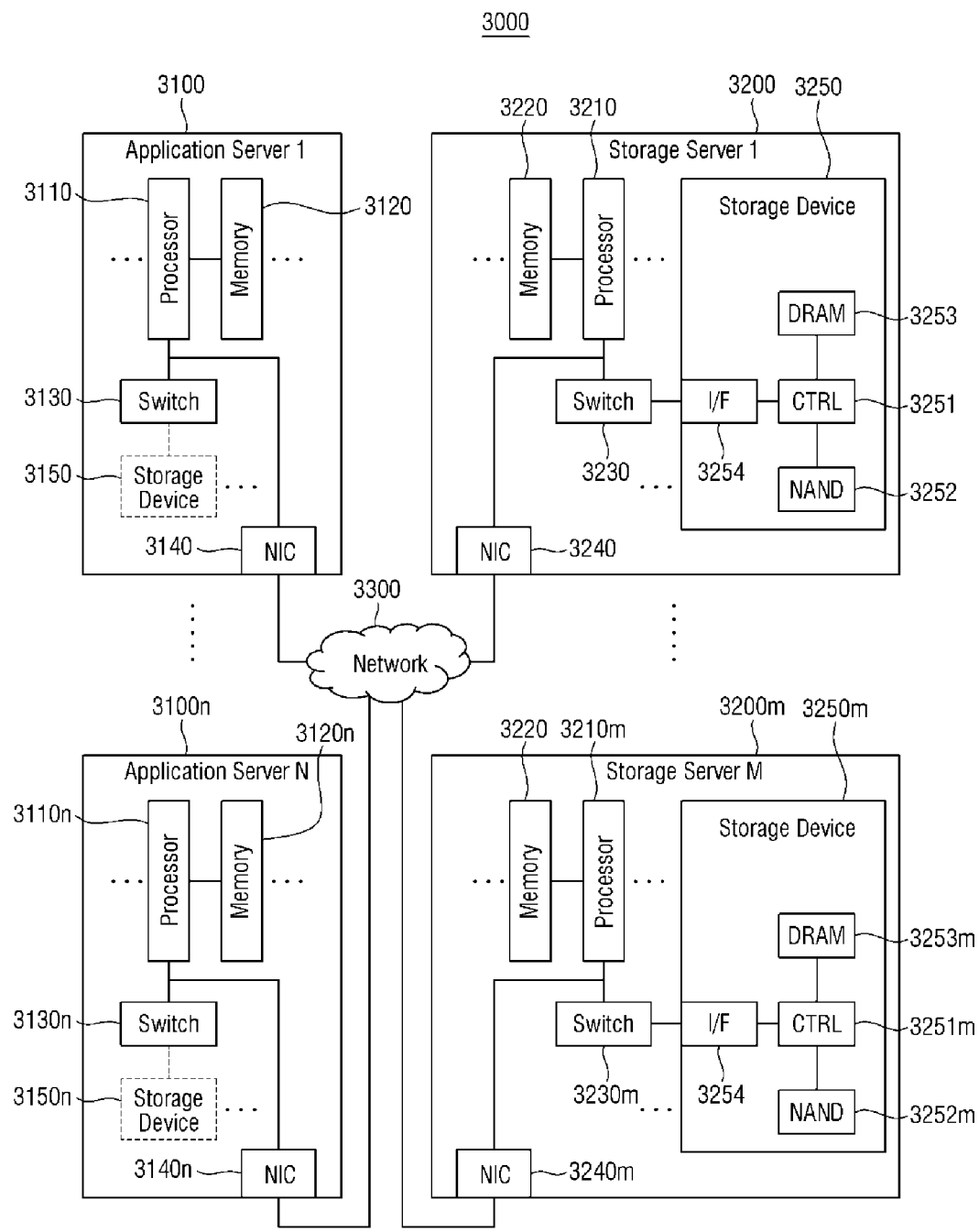
FIG. 8 illustrates a diagram of a data center to which a memory device is applied, according to embodiments of the inventive concepts.

FIG. 8 illustrates a diagram of a data center 3000 to which a memory device is applied, according to embodiments of the inventive concepts.

Referring to FIG. 8, the data center 3000 may be a facility that collects various types of pieces of data and provides services, and may be referred to as a data storage center. The data center 3000 may be a system for operating a search engine and a database, and may be a computing system used by companies, such as banks, or government agencies. The data center 3000 may include application servers 3100 to 3100n and storage servers 3200 to 3200m. The number of application servers 3100 to 3100n and the number of storage servers 3200 to 3200m may be variously selected according to embodiments. The number of application servers 3100 to 3100n may be different from the number of storage servers 3200 to 3200m. For example, although not limited as part of a stand-alone electronic device, the application servers 3100 to 3100n may correspond to or function similarly to the host device 11 of FIG. 1, and the storage servers 3200 to 3200m may correspond to or function similarly to the storage device 12 of FIG. 1.

The application server 3100 or the storage server 3200 may include at least one of processors 3110 and 3210, and memories 3120 and 3220. For example, memory 3120 may correspond to or function similarly to the above mentioned cache. The storage server 3200 will hereinafter be described as an example.

The processor 3210 of the storage server 3200 may control all operations of the storage server 3200, access the memory 3220, and execute instructions and/or data loaded in the memory 3220. The memory 3220 may for example be a double-data-rate synchronous DRAM (DDR SDRAM), a high-bandwidth memory (HBM), a hybrid memory cube (HMC), a dual in-line memory module (DIMM), Optane™ DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor.

The above description of the storage server 3200 may be similarly applied to the application server 3100. In some embodiments, the application server 3100 may not include a storage device 3150. In some embodiments, a switch 3130 may be connected between the processor 3110 and the storage device 3150. The storage server 3200 may include at least one storage device 3250.

In some embodiments, a switch 3230 may be connected between the processor 3210 and the storage device 3250. In some embodiments, the storage device 3250 may include a controller (CTRL) 3251, a flash memory device (NAND) 3252, a DRAM 3253 and an interface (I/F) 3254. The number of storage devices 3250 included in the storage server 3200 may be variously selected according to embodiments.

The application servers 3100 to 3100n may communicate with the storage servers 3200 to 3200m through a network 3300 (e.g., via Network Interface Cards (NICs) 3140 to 3140n and 3240 to 3240m). The network 3300 may be implemented by using a fiber channel (FC) or Ethernet. In this case, the FC may be a medium used for relatively high-speed data transmission and use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

The functionality and features of components 3210m, 3220m, 3230m, 3240m, 3250m, 3251m, 3252m, 3253m and 3254m of the server storage 3200m are respectively the same as the similarly denoted components in the storage server 3200. Likewise, the functionality and features of components 3110n, 3120n, 3130n, 3140n and 3150n in application server 3100n are respectively the same as the similarly denoted components in the application server 3100. Redundant description of such similar components is omitted for the sake of brevity.

According to embodiments of the inventive concepts, there is provided a data center system (e.g., 3000) including: a plurality of application servers (3100 to 3100*n*); and a plurality of storage servers (e.g., 3200 to 3200*m*), wherein each of the storage servers includes a storage device supporting the HPB, and wherein at least one of the plurality of application servers is configured to perform the method for caching data as described above with respect to FIGS. 1-4.

Figure 9:
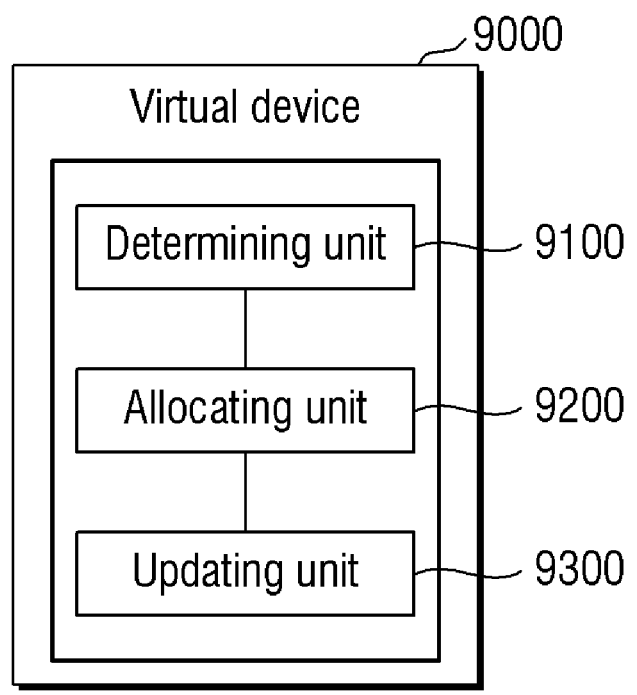
FIG. 9 illustrates a block diagram of a host device according to embodiments of the inventive concepts.

FIG. 9 illustrates a block diagram of a host device according to embodiments of the inventive concepts.

The host device 9000 according to various example embodiments of the inventive concepts may be a virtual device. The host device 9000 herein may correspond to the host device 11 of FIG. 1.

As shown in FIG. 9, the host device 9000 may include a determining unit 9100, an allocating unit 9200 and an updating unit 9300. In some embodiments, the determining unit 9100, the allocating unit 9200 and the updating unit 9300 may for example respectively be a determining circuit, an allocating circuit and an updating circuit. It should be understood to those skilled in the art that the host device 9000 may additionally include other components, and the components included in the host device 9000 may be split or combined.

The determining unit 9100 may determine a first file in a storage device (e.g., the storage device 12 of FIG. 1) as a first predetermined type of file. In this case, the first predetermined type of file may be a hot file.

According to some example embodiments, the determining unit 9100 may obtain or determine a change in a heat of the first file in the storage device, and when the first file is a file whose heat is changed from outside a first predetermined heat range to within the first predetermined heat range, the determining unit 9100 may determine the first file as a hot file.

For example, the heat of the first file may be determined based on an access frequency of the first file in the storage device. However, the example is not limited thereto, and other criteria (e.g., creation time of the file, etc.) may be used to determine the heat of the first file.

For example, the first predetermined heat range may be a range higher than (e.g., greater than or equal to) a first threshold, and the first threshold may be predetermined.

According to some example embodiments, the determining unit 9100 may periodically obtain the change in the heat of the first file in the storage device; or the determining unit 9100 may update the heat of the first file to be read and obtain the change in the heat of the first file to be read, in response to a request for reading the first file. It should however be understood to those skilled in the art that the inventive concepts are not limited to determining the change in the heat of the file as described above, and that in other embodiments various known methods may be used to obtain the change of the heat of the first file and to determine whether the first file is a hot file.

The allocating unit 9200 may reallocate a logical address of a predetermined logical address region to the first file.

According to some example embodiments, the allocating unit 9200 may read the first file from the storage device, and reallocate a new logical address of the predetermined logical address region to the first file.

The updating unit 9300 may update a first L2P table, corresponding to the predetermined logical address region, in a cache (e.g., a cache (not shown) of the host device 9000).

According to some example embodiments, the updating unit 9300 may write the first file to the storage device, so that the storage device writes the first file to a new physical address and establishes a mapping relationship between the reallocated logical address and the new physical address in an L2P table of the storage device. Then, the updating unit 9300 may acquire the mapping relationship between the reallocated logical address and the new physical address of the first file from the storage device, and update the first L2P table in the cache of the host device 9000 based on the mapping relationship.

According to some example embodiments, the updating unit 9300 may establish a mapping relationship between the reallocated logical address of the first file and an original physical address of the first file, in the first L2P table. In addition, the updating unit 9300 may transmit a logical address update message including an original logical address and the reallocated logical address of the first file to the storage device through a reserved interface, so that the storage device establishes the mapping relationship between the reallocated logical address and the original physical address of the first file in the L2P table.

Alternatively, the updating unit 9300 may firstly transmit the logical address update message including the original logical address and the reallocated logical address of the first file to the storage device through the reserved interface, so that the storage device establishes the mapping relationship between the reallocated logical address and the original physical address of the first file. Then, updating unit 9300 may acquire the mapping relationship between the reallocated logical address and the original physical address of the first file from the storage device, and update the first L2P table in the cache based on the mapping relationship.

For example, the cache of the host device 9000 may be non-volatile memory or volatile memory. When the cache is volatile memory, and after the host device 9000 is powered on, heat information of files in the storage device and the first L2P table may be loaded from the storage device to the cache of the host device 9000. Before the host device 9000 is powered off, a file system (not shown) of the host device 9000 writes the heat information of the files in the storage device and the first L2P table into the storage device, so as to avoid loss of the information due to the powering off of the host device 9000.

In addition, the determining unit 9100 may determine the first file as a second predetermined type of file. In this case, the second predetermined type of file may be a cold file.

According to some example embodiments, the determining unit 9100 may obtain a change in a heat of the first file in the storage device, and when the first file is a file whose heat is changed from outside a second predetermined heat range to within the second predetermined heat range, the determining unit 9100 may determine the first file as a cold file.

For example, the second predetermined heat range may be a range lower than (e.g., smaller than) the first threshold.

The allocating unit 9200 may reallocate a logical address outside of the predetermined logical address region to the first file.

According to some example embodiments, the allocating unit 9200 may read the first file from the storage device, and reallocate the logical address outside the predetermined logical address region to the first file.

The updating unit 9300 may update the first L2P table, corresponding to the predetermined logical address region, in the cache of the host device 9000.

According to some example embodiments, the updating unit 9300 may write the first file to the storage device, so that the storage device writes the first file to a new physical address and establishes a mapping relationship between the reallocated logical address and the new physical address in a L2P table of the host device 9000. Then, the updating unit 9300 may delete a mapping relationship between an original logical address and an original physical address of the first file from the first L2P table to update the first L2P table in the cache of the host device 9000.

According to some example embodiments, the updating unit 9300 may transmit a logical address update message including the original logical address and the reallocated logical address of the first file to the storage device through a reserved interface, so that the storage device establishes a mapping relationship between the reallocated logical address and an original physical address of the first file. Then, the updating unit 9300 may delete a mapping relationship between the original logical address and the original physical address of the first file from the first L2P table to update the first L2P table in the cache of the host device 9000.

The file system may set a state bitmap of the original logical address of the first file to a dirty state.

According to some example embodiments, the file system may set the state bitmap of the original logical address (e.g., the original logical address is an address within the predetermined logical address region) of the first file to the dirty state.

Furthermore, in addition to the hot and cold files, the host device 9000 may also determine warm files in the storage device. An example of determining and processing the hot files, the warm files, and the cold files in the storage device has been described above with reference to FIG. 4, and repeated description will be omitted here to avoid redundancy.

In some embodiments of the inventive concepts as described, the frequency of writing the above noted first file to the storage device may be reduced, thereby reducing power consumption of the host device and the storage device, by maintaining the original physical address of the first file. In other embodiments, before the host device is powered off, the first L2P table corresponding to the predetermined logical address region in the cache is stored in the storage device, to thus avoid loss of the information due to the powering off of the host device.

In various embodiments of the inventive concepts, apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application.

In other examples, one or more of the hardware components that perform the operations described may be implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

For example, embodiments of the inventive concepts may include a non-transitory computer-readable storage medium for storing software code executable by a processor or controller such as main processor 1100 in FIG. 5, host controller 110 in FIG. 6, UFS host controller 2110 in FIG. 7, or processors 3110 and 3100*n* in FIG. 8 for example. The processor may control a storage device such as storage devices 1300*a* and 1300*b* in FIG. 5, storage device 200 in FIG. 6, UFS device 2200 in FIG. 7, or storage servers 3200 and 3200*m* in FIG. 8 for example. In an embodiment, the non-transitory computer-readable storage medium may include a first reallocation code segment for reallocating a logical address of a predetermined logical address region of a first logical address to physical address (L2P) table in a cache to a first file in the storage device, when the first file changes to a first predetermined type of file; and a first update code segment for updating the first L2P table corresponding to the predetermined logical address region in the cache. The updated first L2P table may include a mapping relationship between the logical address reallocated for the first file and a physical address of the first file.

For example, in further embodiments, the non-transitory computer-readable storage medium may include a second reallocation code segment for reallocating a logical address outside of the predetermined logical address region of the first L2P table in the cache to the first file, when the first file changes to a second predetermined type of file; and a second update code segment for updating the first L2P table corresponding to the predetermined logical address region in the cache responsive to reallocation of the logical address outside of the predetermined logical address region when the first file changes to the second predetermined type of file. A setting code segment for setting a state bitmap of an original logical address of the first file to a dirty state.

In still further embodiments, the non-transitory computer-readable storage medium may include various code segments for instructing a processor to perform the various features as described with respect to FIGS. 1-4.

While this disclosure includes specific examples, it should be apparent to one of ordinary skill in the art that various changes in form and detail may be made in these examples without departing from the spirit and scope of the claims and their equivalents.

What is claimed is:

1. A method of caching data, comprising:
   reallocating a logical address of a predetermined logical address region of a first logical to physical address (L2P) table in a cache to a first file in a storage device, when the first file changes to a first predetermined type of file; and
   updating the first L2P table, corresponding to the predetermined logical address region in the cache to provide an updated first L2P table,
   wherein the updated first L2P table includes a mapping relationship between the reallocated logical address and a physical address of the first file, and
   wherein updating of the first L2P table comprises:
      establishing the mapping relationship between the reallocated logical address and the physical address of the first file in the first L2P table, wherein the physical address of the first file is an original physical address of the first file; and
      transmitting a logical address update message, which includes an original logical address and the reallocated logical address, to the storage device through a reserved interface, so that the storage device establishes the mapping relationship between the reallocated logical address and the original physical address of the first file.

2. The method of caching data of claim 1, wherein reallocating the logical address of the predetermined logical address region to the first file comprises reading the first file from the storage device, and reallocating a new logical address of the predetermined logical address region to the first file, and
   wherein updating the first L2P table corresponding to the predetermined logical address region in the cache comprises:
   writing the first file to the storage device, so that the storage device writes the first file to a new physical address and establishes a mapping relationship between the reallocated logical address and the new physical address; and
   acquiring the mapping relationship between the reallocated logical address and the new physical address of the first file from the storage device, and
   updating the first L2P table in the cache based on the acquired mapping relationship.

3. The method of caching data of claim 1, wherein updating the first L2P table corresponding to the predetermined logical address region in the cache further comprises:
   acquiring the mapping relationship between the reallocated logical address and the original physical address of the first file from the storage device, and updating the first L2P table in the cache based on the acquired mapping relationship.

4. The method of caching data of claim 1, wherein the cache is disposed in a host device, the method of caching data further comprising:

before the host device is powered off, storing the first L2P table corresponding to the predetermined logical address region from the cache to the storage device.

5. The method of caching data of claim 1, further comprising:
reallocating a logical address outside of the predetermined logical address region of the first L2P table in the cache to the first file, when the first file is changed to a second predetermined type of file;
updating the first L2P table corresponding to the predetermined logical address region in the cache responsive to reallocating the logical address outside of the predetermined logical address region when the first file is changed to the second predetermined type of file; and
setting a state bitmap of an original logical address of the first file to a dirty state.

6. The method of caching data of claim 5, wherein the first predetermined type of file is a hot file, and the second predetermined type of file is a cold file.

7. A host device, comprising:
an allocating unit configured to reallocate a logical address of a predetermined logical address region of a first logical address to physical address (L2P) table in a cache of the host device to a first file in a storage device, when the first file changes to a first predetermined type of file; and
an updating unit configured to update the first L2P table corresponding to the predetermined logical address region in the cache to provide an updated first L2P table,
wherein the updated first L2P table includes a mapping relationship between the reallocated logical address and a physical address of the first file, and
wherein the updating unit is further configured to
establish the mapping relationship between the reallocated logical address of the first file and the physical address of the first file in the first L2P table, wherein the physical address of the first file is an original physical address of the first file; and
transmit a logical address update message, which includes an original logical address and the reallocated logical address, to the storage device through a reserved interface, so that the storage device establishes the mapping relationship between the reallocated logical address and the original physical address of the first file.

8. The host device of claim 7, wherein the allocating unit is further configured to read the first file from the storage device, and reallocate a new logical address of the predetermined logical address region to the first file, and
wherein the updating unit is further configured to
write the first file to the storage device, so that the storage device writes the first file to a new physical address and establishes a mapping relationship between the reallocated logical address and the new physical address, and
acquire the mapping relationship between the reallocated logical address and the new physical address of the first file from the storage device, and update the first L2P table in the cache based on the acquired mapping relationship.

9. The host device of claim 7, wherein the updating unit is further configured to
acquire the mapping relationship between the reallocated logical address and the original physical address of the first file from the storage device, and update the first L2P table in the cache based on the acquired mapping relationship.

10. The host device of claim 7, further comprising a file system configured to store the first L2P table corresponding to the predetermined logical address region from the cache to the storage device, before the host device is powered off.

11. The host device of claim 7, wherein the allocating unit is further configured to reallocate a logical address outside of the predetermined logical address region of the first L2P table in the cache to the first file, when the first file changes to a second predetermined type of file,
wherein the updating unit is further configured to update the first L2P table corresponding to the predetermined logical address region in the cache responsive to reallocation of the logical address outside of the predetermined logical address region when the first file changes to the second predetermined type of file, and
the host device further comprises a file system configured to set a state bitmap of an original logical address of the first file to a dirty state.

12. The host device of claim 11, wherein the first predetermined type of file is a hot file, and the second predetermined type of file is a cold file.

13. A storage system comprising:
a storage device configured to store files; and
a host device including a cache, the host device configured to
reallocate a logical address of a predetermined logical address region of a first logical address to physical address (L2P) table in the cache to a first file in the storage device, when the first file changes to a first predetermined type of file,
update the first L2P table corresponding to the predetermined logical address region in the cache to provide an updated first L2P table,
reallocate a logical address outside of the predetermined logical address region of the first L2P table in the cache to the first file, when the first file changes to a second predetermined type of file, and
update the first L2P table corresponding to the predetermined logical address region in the cache responsive to reallocation of the logical address outside of the predetermined logical address region when the first file changes to the second rad type of file,
wherein the updated first L2P table includes a mapping relationship between the logical address reallocated for the first file and a physical address of the first file, and
wherein the host device further comprises a file system configured to set a state bitmap of an original logical address of the first file to a dirty state.

14. The storage system of claim 13, wherein the host device comprises:
a memory configured to store one or more instructions; and
a main processor configured to execute the one or more instructions to reallocate the logical address of the predetermined logical address region of the first L2P table in the cache to the first file, and to update the first L2P table.

15. The storage system of claim 13, wherein the host device comprises a universal flash storage (UFS) host and the storage device comprises a UFS device, the storage system further comprising a UFS interface configured to provide communication between the UFS host and the UFS device.

16. The storage system of claim 13, wherein the host device comprises a plurality of application servers, and the storage device comprises a plurality of storage servers.

17. The storage system of claim 16, wherein the first predetermined type of file is a hot file, and the second predetermined type of file is a cold file.

* * * * *